United States Patent
Mossoba et al.

(10) Patent No.: US 12,174,934 B2
(45) Date of Patent: Dec. 24, 2024

(54) MAZE-BASED USER AUTHENTICATION

(71) Applicant: Capital One Services, LLC, McLean, VA (US)

(72) Inventors: Michael Mossoba, Great Falls, VA (US); Ryan Christopher Farber, Daly City, CA (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 275 days.

(21) Appl. No.: 17/932,440

(22) Filed: Sep. 15, 2022

(65) Prior Publication Data

US 2024/0095330 A1 Mar. 21, 2024

(51) Int. Cl.
*G06F 21/36* (2013.01)
*G06F 21/31* (2013.01)

(52) U.S. Cl.
CPC ............ *G06F 21/36* (2013.01); *G06F 21/316* (2013.01)

(58) Field of Classification Search
CPC .............................. G06F 21/36; G06F 21/316
See application file for complete search history.

(56) References Cited

U.S. PATENT DOCUMENTS

| 11,961,348 B1* | 4/2024 | Galambos .......... G07C 9/00571 |
| 2019/0108686 A1* | 4/2019 | Spivack .............. G06Q 30/0277 |
| 2021/0342430 A1 | 11/2021 | Benkreira et al. |

\* cited by examiner

*Primary Examiner* — Mohammad W Reza
(74) *Attorney, Agent, or Firm* — Harrity & Harrity, LLP

(57) ABSTRACT

In some implementations, a system may transmit information that identifies behavioral data to be collected by a user device in connection with completion of a digital maze via user interaction with a user device. The maze may include starting and finishing points and an authentication path therebetween. The maze may include digital landmarks, a subset of which may be along the authentication path. The system may receive the behavioral data, and may provide the behavioral data and a task identifier identifying the maze as a feature set that is input to a machine learning model. The system may receive an output from the machine learning model, and may cause a recommended action to be performed with respect to verifying an identity of a user of the user device based on the output.

20 Claims, 8 Drawing Sheets

MAZE-BASED USER AUTHENTICATION

BACKGROUND

Identity verification involves actions taken to prevent undesirable access to a user's secure area by confirming that the user is the user with which the secure area is associated. Identity verification may include directing the user to complete a task to obtain access to a secure area. Common tasks may include providing authentication information, such as a username, password, personal identification number (PIN), and/or other authentication information. This may help prevent unauthorized access to the user's secure area.

SUMMARY

Some implementations described herein relate to a system for maze-based user authentication. The system may include one or more memories and one or more processors communicatively coupled to the one or more memories. The one or more processors may be configured to transmit information that identifies behavioral data to be collected by a user device in connection with completion of a digital maze via user interaction with the user device. The one or more processors may be configured to receive the behavioral data, wherein the behavioral data is collected by the user device during performance of the maze via the user interaction with the user device. The one or more processors may be configured to provide the behavioral data and a task identifier, that identifies the maze as a feature set that is input to a machine learning model. The one or more processors may be configured to receive output from the machine learning model. The one or more processors may be configured to cause a recommended action to be performed with respect to verifying an identity of a user of the user device based on the output from the machine learning model.

Some implementations described herein relate to a method. The method may include receiving, by a system having one or more processors, a request to verify an identity of a user. The method may include transmitting, by the system, information that identifies a digital maze to be completed via user interaction with a user device and information that identifies behavioral data to be collected by the user device in connection with completion of the digital maze, where the digital maze includes a starting point, a finishing point, and an authentication path between the starting point and the finishing point, and where a difficulty of the digital maze is based on a maze completion proficiency of the user. The method may include receiving, by the system, the behavioral data, wherein the behavioral data is collected by the user device during completion of the digital maze via user interaction with the user device. The method may include performing, by the system, identity verification associated with the user based on the behavioral data and the digital maze, where the identity verification is performed using a machine learning model that identifies patterns associated with the behavioral data and the digital maze. The method may include transmitting, by the system, an indication of a recommended action to be performed with respect to the user and the user device based on performing the identity verification.

Some implementations described herein relate to a user device. The user device may include a memory and one or more processors communicatively coupled to the memory. The one or more processors may be configured to present, on a user interface of the user device, a digital maze. The one or more processors may be configured to receive a user interaction with the digital maze along the authentication path. The one or more processors may be configured to collect behavioral data associated with the user interaction during completion of the digital maze. The one or more processors may be configured to transmit, to a system, the behavioral data. The one or more processors may be configured to receive, from the system, a recommended action to be performed with respect to verification of an identity of the user based on the behavioral data.

The one or more processors may be configured to perform the recommended action.

DETAILED DESCRIPTION

Figure 1A:
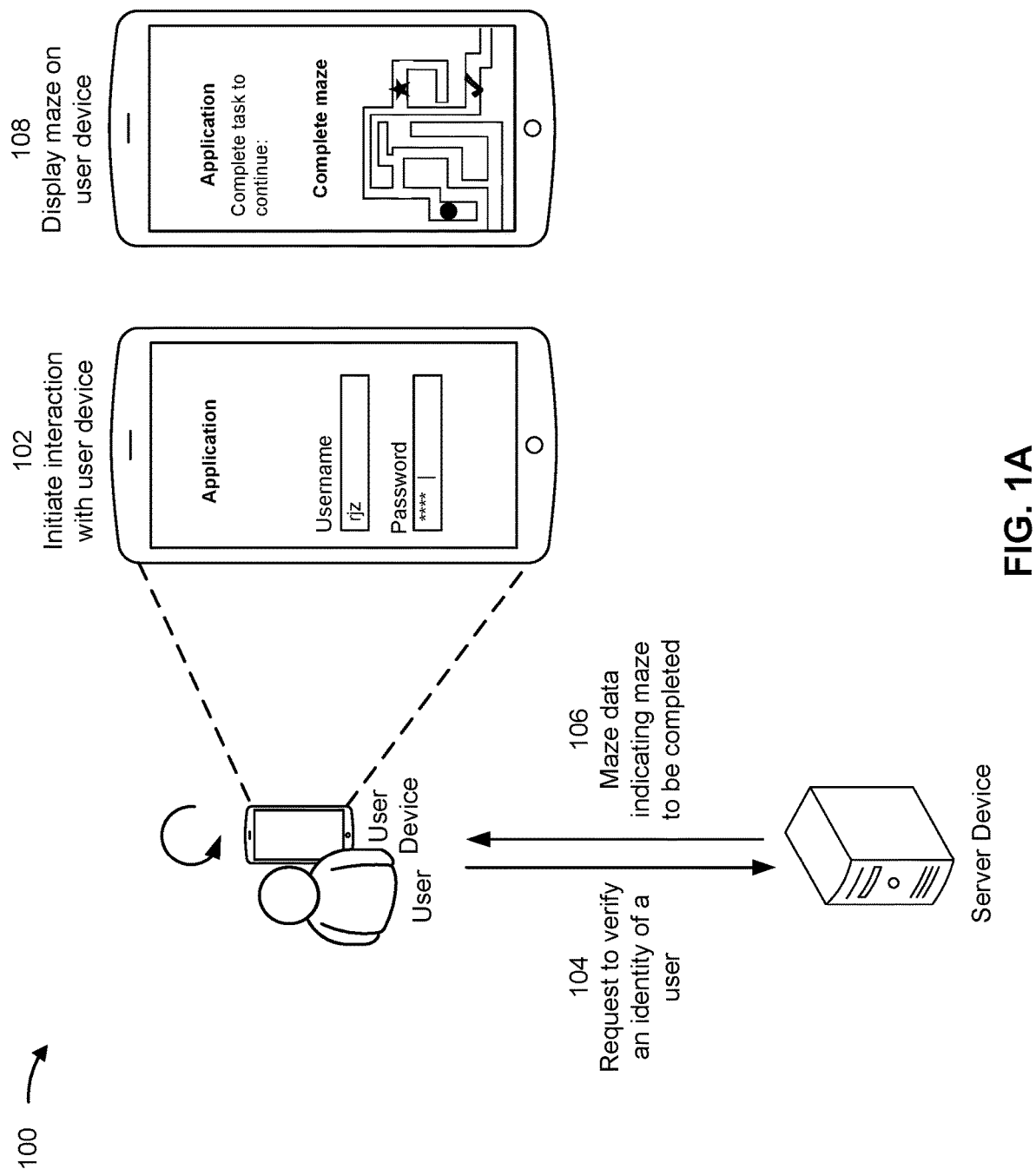
FIGS. 1A-1C are diagrams of an example implementation relating to maze-based user authentication, in accordance with some embodiments of the present disclosure.

The following detailed description of example implementations refers to the accompanying drawings. The same reference numbers in different drawings may identify the same or similar elements.

Identity verification involves actions taken to prevent undesirable access to a user's secure area by requiring proof of the user's identity. Identity verification may include requiring the completion of tasks. A successful completion of tasks may confirm the user's identity to a third party in order for the user to obtain access to a secure area. Secure areas may include both physical areas (such as buildings, vehicles, and/or the like) and nonphysical areas (such as bank accounts, websites, and/or the like). Common tasks may include providing authentication information, such as a username, password, PIN, and/or the like to prove the user's identity, because such authentication information may be assumed to be known only by the user.

However, some tasks may be easily completed by other parties who have illegitimately obtained enough information about the user to pose as the user. For example, a fraudulent actor who steals the user's authentication information (e.g., a username, a password, a birthdate, an address, and/or the like) may obtain access to the user's secure area if the task is to provide this particular authentication information. Fraudulent actors (which may include bots) that are able to crack secure databases and obtain authentication information on users may be able to compromise many users' secure areas by posing as the users using the illegitimately obtained authentication information.

Illegitimate access to the users' secure areas wastes resources in numerous ways. Providers (who provide the goods and/or services to the users) may attempt to identify, diagnose, and remedy errors due to allowing unauthorized access to the users' secure areas. For example, providers may use computing resources (e.g., processor resources, memory resources, storage resources, and/or the like) associated with reversing an illegitimate interaction that resulted from incorrect identity verification. In another example, computing resources may be used to update a system (e.g., prompting a user to provide alternative authentication information, and/or the like) to prevent future unauthorized access.

Some implementations described herein provide for a system in which a user may be authenticated based on behavioral data collected in connection with the user's performance and/or completion with a digital maze presented on a user device of the user. The digital maze may include starting and finishing points and an authentication path therebetween. The maze may include digital landmarks, a subset of which may be along the authentication path. In some implementations, the user may configure an order for passing through the digital landmarks, and the user may be required to pass through the digital landmarks (e.g., by touching, swiping, or the like on a display) in that order when using maze-based authentication (e.g., by navigating a displayed maze). This increases security as compared to maze-based authentication without digital landmarks. Based on the behavioral data collected, the system may authenticate the user. In some implementations described herein, the system may use a machine learning model, in which the behavioral data is provided as inputs, to determine if the user should be authenticated. In some implementations, a user's maze completion proficiency may be analyzed (e.g., prior to using a maze for authentication, such as during a setup procedure) and may be used as behavioral data for maze-based authentication, thereby increasing security by providing an additional factor to assist with user authentication (e.g., by using the user's maze completion proficiency to determine a likelihood that a person completing the maze is the user).

Accordingly, the system may be able to detect illegitimate access by analyzing the behavioral data. The behavioral data may be unique to each user and difficult for an illegitimate user to imitate, allowing the identity verification platform to successfully verify an identity and/or detect illegitimate access. This may result in accurate identity verification, which in turn saves computing resources associated with identifying, diagnosing, and remedying illegitimate activity after the fact (e.g., after the illegitimate activity occurs). For example, computing resources used to reverse an illegitimate transaction that resulted from incorrect identity verification may be saved.

Figure 1B:
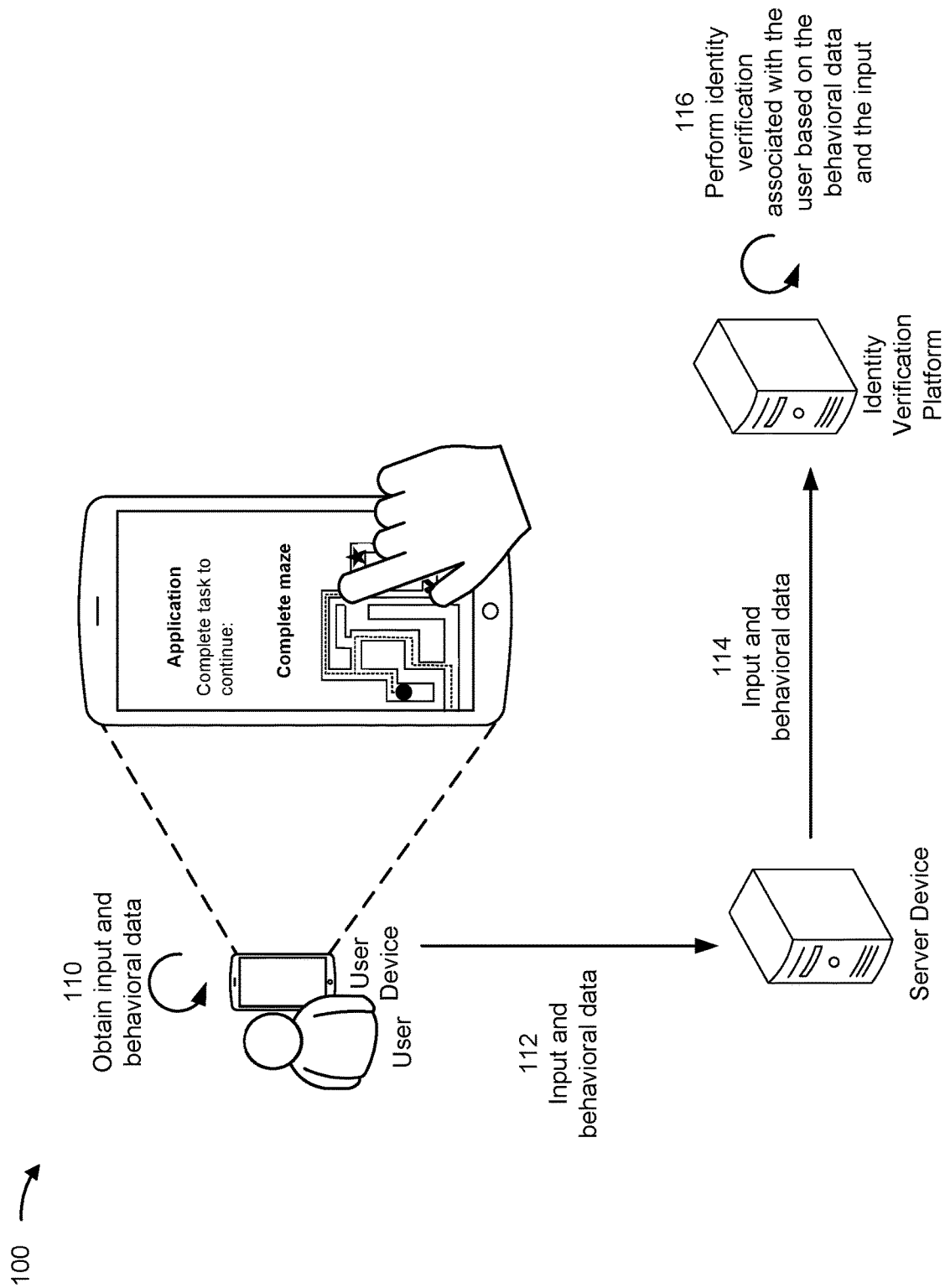
Figure 1C:
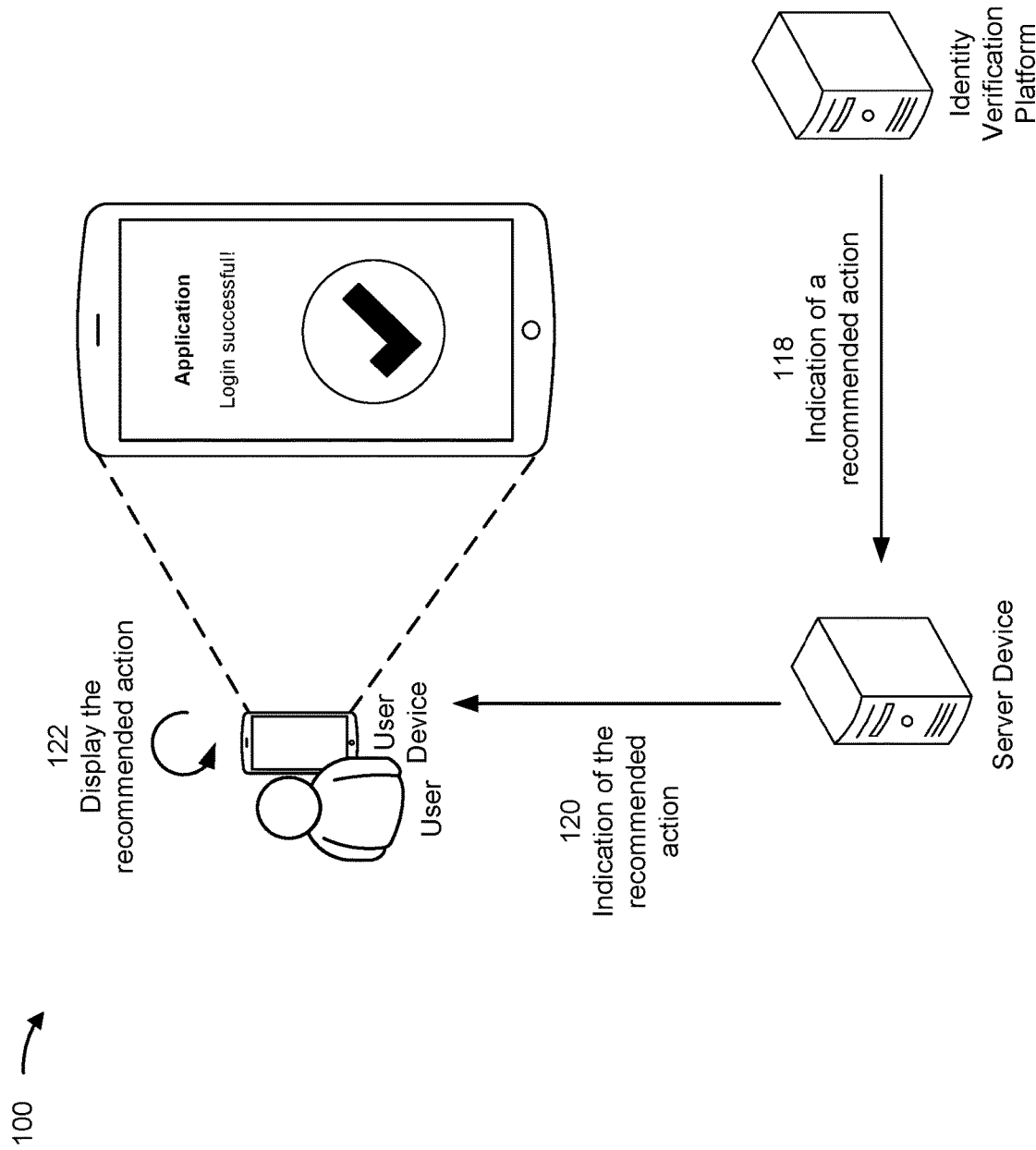

FIGS. 1A-1C are diagrams of an example 100 associated with maze-based user authentication. As shown in FIGS. 1A-1C, example 100 includes an identity verification platform, a user device, and a server device. These devices are described in more detail in connection with FIGS. 3 and 4. The server device may be configured to send and/or receive information from the identity verification platform, which may perform identity verification based on analyzing information received by the identity verification platform. The server device may transmit information to the user device based on recommended actions from the identity verification platform.

As shown in FIG. 1A, and by reference number 102, the user may use the user device to initiate an interaction associated with the server device. For example, the user may use the user device to interact with an application provided by or otherwise associated with the server device. The application may provide access to a user's secure area associated with the server device (e.g., bank account information or billing information). While interaction with an example maze application is displayed in the figures, any type of interaction, service, and/or the like may be relevant to this example. The interaction may be accessed via a webpage, application, and/or the like on the user device.

In some implementations, the user device may have sensors to obtain behavioral data from the user interacting with the user device, such as during interaction with a displayed maze. Behavioral data may include any information from the user interacting with the user device, such as during interaction with a displayed maze. This may include various types of data associated with the user interacting with a maze provided for display via a screen of the user device (e.g., speed, path, jiggle, pressure, temperature, path, and/or the like). For example, if the user moves a finger across the maze on the user device, the user device sensors may obtain data of a path of the movement, a speed of the movement, a pressure associated with the movement, a temperature of the finger placed on the screen, a size associated with the finger area touching the screen, and/or the like. As another example, if the user moves his or her eyes across the screen during interaction with the displayed maze, the user device sensors (e.g., a retina scanner) may obtain path data of the retina movement. Additionally, or alternatively, the behavioral data may include various types of data associated with the user moving the user device during interaction with the displayed maze (e.g., force data, acceleration data, velocity data, directional data, positional data, and/or the like). For example, if the user is walking with the user device while interacting with the maze, one or more user device sensors (e.g., a gyroscope, a global positioning system (GPS)) may be used to obtain data for directional acceleration, force acceleration, directional change, user device positionality, and/or the like.

In some implementations, the behavioral data may be related to a user's maze completion proficiency (described below) and/or an interaction with digital landmarks included in the maze (also described below). Additionally, or alternatively, the behavioral data may include other information associated with the user interacting with the user device or information associated with the user completing the digital maze on the user device, such as a height of the user device when the user is holding the user device, a detected object that the user uses to interact with the user device (e.g., a mouse, a touchscreen, a stylus, a finger, and/or the like), and/or the like. In some implementations, the behavioral data may include timing information (e.g., a time associated with completing a task, and/or the like). In some implementations, the behavioral data may include types of behavioral data as a function of time (e.g., acceleration over time, pressure over time, force over time, and/or the like). These examples for behavioral data are listed merely as illustrative examples and are not intended to limit the scope of what may be considered to be behavioral data.

In some implementations, through initiating the interaction with the user device, the user may input information preliminarily identifying the user. For example, the user may input authentication information (e.g., a username, password, or PIN) to the user device. As shown in FIG. 1A, and by reference number 104, the user device may send a request to verify an identity of the user to the server device. Based on receiving the request, the server device may determine to send maze data indicating the digital maze to be completed by the user to confirm the identity of the user. The digital maze may have one or more starting points, one or more finishing points, and one or more authentication paths defined from one of the starting points to one of the finishing points.

In some implementations, the server device may select a maze from a stored set of candidate mazes. In some implementations, each stored maze may be associated with a corresponding maze completion proficiency, and the server device may select a maze from the stored set based on a maze completion proficiency associated with the user. In some implementations, the server device may select a maze that includes one or more digital landmarks previously indicated by the user and/or may select a maze that enables user navigation through the digital landmarks in an order previously specified by the user. Additionally, or alternatively, the server device may generate the maze according to one or more rules, such as a quantity of valid paths through the maze (or a range of quantities), a quantity of dead ends (or a range of quantities), a width of paths in the maze (or a range of widths), and/or a quantity of digital landmarks to be included in the maze (or a range of quantities). In some implementations, the values used for these quantities or ranges may be based on a maze completion proficiency associated with the user.

The server device may determine characteristics of the digital maze (e.g., difficulty, complexity, one or more digital landmarks, types of digital landmarks, number of starting points of the digital maze, and/or number of finishing points of the digital maze) based on the authentication information received. For example, a particular user may be associated with a particular maze difficulty level (e.g., easy, medium, or hard). When the server device receives the authentication information and associates the authentication information with a particular user, the server device may identify a maze completion proficiency level of the user and transmit maze data indicating a digital maze having a difficulty level corresponding to the maze completion proficiency level of the user.

In some implementations, the maze completion proficiency level of the user may be determined based on a maze proficiency test that the user may take (e.g., initially when setting up a user account and/or the user device). For example, the server device may provide, to the user device, multiple digital mazes of varying degrees of difficulty. The server device may determine the user's maze completion proficiency level based on the user's performance in completing the mazes (e.g., success rate, highest difficulty maze completed, or time to complete the mazes). The user may opt to take the maze proficiency test at any time to update the user's maze completion proficiency level.

Additionally, or alternatively, the server device may determine and/or update the user's maze completion proficiency level based on the user's performance with the actual digital mazes provided as part of the authentication process. As the user improves (e.g., decreases in completion time and/or mistakes, such as changes in direction and/or touching walls of the digital maze), the server device may update the user's maze completion proficiency level, and send future digital mazes having corresponding difficulty levels with the updated maze completion proficiency level.

In some implementations, the digital maze may have digital landmarks throughout the digital maze. The digital landmarks may be associated with one or more of multiple types of digital landmarks (e.g., icons, pictures, shapes, alphanumeric characters, and/or emojis). A subset of the digital landmarks may be along the authentication path. The subset of the digital landmarks may be of a common type or may be of a different type.

Additionally, or alternatively, the authentication path may pass through the digital landmarks in a particular order, which may be based on the user preference (e.g., as set up under the user's account) or based on the user's behavioral data (e.g., the subset of the digital landmarks includes an order of the digital landmarks). For example, in implementations in which the digital landmarks are of different types, the authentication path may require a first type to be passed through first, a second type to be passed through second, etc. The user may be associated with a particular type or types of digital landmarks and/or order of digital landmarks (e.g., the user may select preferred type(s) of digital landmarks and/or the order in which the digital landmarks need to be selected along the authentication path).

Additionally, or alternatively, the digital maze may include multiple starting points and/or multiple finishing points. Accordingly, the digital maze may have multiple paths between one of the starting points and one of the finishing points. In some implementations, only one of the paths may be determined to be the authentication path. For example, the user may select which one is the authentication path directly (e.g., during setup) and/or indirectly (e.g., by the chosen digital landmarks along a particular path). Alternatively, any one of the paths may be an authentication path.

As shown by reference number 106, the server device may transmit, to the user device, maze data indicating the particular digital maze for the user device to display. Additionally, the maze data may indicate the behavioral data to be collected by the user device as the user interacts with the user device to complete the maze. Examples of the behavioral data may include time to complete the digital maze, velocity of the user interaction, acceleration of the user interaction (e.g., indicating a behavior of cutting corners of the maze), a number of deviations from the authentication path, a proximity of the user interaction to walls forming the digital maze, a proximity of the user interaction to corners in the digital maze, pressure of the user interaction with the user device, and/or size of a finger associated with the user interaction. As shown by reference number 108, the user device may display the digital maze.

In some implementations, a subset of the behavioral data may be associated with the plurality of digital landmarks. As an example, in a scenario in which the subset of the digital landmarks are of a common type, the subset of the behavioral data may include a number of instances that the user interaction passes through a different digital landmark (e.g., not the common type). Other examples of the subset of the subset of behavioral data may be a velocity of the user interaction through the subset of digital landmarks, an acceleration of the user interaction to or through one of the subset of digital landmarks, or a pause in the user interaction along the authentication path that exceeds a time threshold and is within a distance of one of the subset of digital landmarks.

In FIG. 1A, the digital landmarks are shown as a dot, a star, and a checkmark. In some cases, a maze associated with a low maze completion proficiency level may include a smaller quantity of digital landmarks (e.g., two or three digital landmarks), and a maze associated with a high maze completion proficiency level may include a larger quantity of digital landmarks (e.g., four or five digital landmarks). In some implementations, more than two maze completion proficiency levels may be used. In some implementations, the user may preconfigure (e.g., during a set up operation to enable maze-based authentication) an order in which the digital landmarks must be passed through (or "touched") for successful authentication.

As shown in FIG. 1B, the user may complete the maze via a user interaction with the user device. For example, the user may use a finger to move along a path in the maze. Alternatively, the user may use a stylus, a pen, a mouse cursor, or the like. Additionally, or alternatively, the user device may be able to track the user's eyes, which may be the user interaction or may accompany the user interaction. For example, the user device may have a retina scanner or a camera configured to scan the retina and track the movement of the user's eyes (e.g., retina) during performance of the digital maze (e.g., the user may perform the digital maze with just the user's eyes).

Additionally, the user device may collect behavioral data associated with the user's eyes while the user is performing the digital maze with the user's eyes or via a different manner (e.g., with the user's finger or with a stylus). For example, the behavioral data may include a duration that the retina focuses on a particular one of the digital landmarks before the user interaction passes through the particular digital landmark. The duration exceeding a duration threshold (e.g., 0.5 seconds or 1 second) may indicate that the user knows the particular digital landmark is part of the authentication path, and therefore, the user should be authenticated. Additionally, or alternatively, the behavioral data may include a number of times that the retina focuses on a particular one of the digital landmarks before the user interaction passes through the particular digital landmark. The number of times exceeding a number threshold similarly may indicate that the user knows the particular digital landmark is part of the authentication path, and therefore, the user should be authenticated. Additionally, or alternatively, in implementations in which the digital landmarks in the maze include multiple types of digital landmarks, and the subset of the digital landmarks in the authentication path are of the common type, the behavioral data may include a number of times the retina looks at one or more of the digital landmarks of a different type. The number of times exceeding a number threshold may indicate that the user does not know which type is the common type, and therefore, the user should not be authenticated.

Additionally, or alternatively, the user may be required to pass through (e.g., touch or look at) the digital landmarks in a particular order for successful authentication. For example, the user may be required to pass through the illustrated dot, then the illustrated star, then the illustrated checkmark, in that order, for successful authentication.

As shown by reference number 110, the user device may obtain the input and behavioral data associated with the user completing the task. The behavioral data may include any of the types of data described in connection with FIG. 1A. The input may indicate a completion of the maze. In some implementations, the input may include various other types of data input by the user or detected by the user device (e.g., a location associated with the user device, a time associated with the user device, and/or the like).

As shown by reference number 112, the user device may send the input and the behavioral data to the server device. The server device may verify that the input is correct. In some implementations, the server device may process the input and/or the behavioral data in preparation for another device to process the input and/or the behavioral data. For example, the user device may aggregate the input and/or the behavioral data with other input and/or behavioral data, format the input and/or the behavioral data, and/or the like, to assist the identity verification platform in processing the input and/or the behavioral data. As shown in FIG. 1B, and by reference number 114, the server device may send the input and/or the behavioral data to the identity verification platform.

As shown by reference number 116, the identity verification platform may perform identity verification associated with the user based on receiving the input and/or the behavioral data. The identity verification platform may determine to verify the user's identity, determine to not verify the user's identity, determine there is not enough information to verify the user's identity, determine a likelihood that the user's identity should be verified, determine an identity verification score, and/or the like. The identity verification platform may perform the identity verification in various ways. In some implementations, the identity verification platform may compare the input and/or the behavioral data with past input and/or behavioral data associated with the user. Input and/or behavioral data that is different (or different to a particular threshold) from the past input and/or behavioral data may indicate that the user's identity is not to be authenticated. For example, if past behavioral data indicates that a user applies a light force when performing the digital maze, behavioral data that indicates a particularly rigorous force was applied when performing the digital maze may be indicative of fraud, even if the digital maze was successfully completed. In some implementations, some input and/or behavioral data may indicate illegitimate access (and that the user's identity should not be verified) for any user. For example, behavioral data that indicates the user is taking a long time (e.g., a time longer than a particular threshold) to complete the digital maze may indicate that the user's identity should not be verified. In some implementations, the identity verification platform may associate particular types of input and/or behavioral data with illegitimate access (and thus should not result in verification) based on processing input and/or behavioral data from other users.

In some implementations, the identity verification platform may determine user attributes from the input and/or the behavioral data. The user attributes may include various information that is to be associated with the user interacting with the user device. Some user attributes may have a high potential to accurately indicate identity verification, while some user attributes may have a low potential to accurately indicate identity verification. The identity verification platform may analyze and combine determinations for each user attribute to determine whether to verify the user. Depending on how the user attribute is weighted, one potentially illegitimate user attribute may not outweigh multiple legitimate user attributes, one potentially illegitimate user attribute may outweigh multiple legitimate user attributes, and/or the like.

In some implementations, the identity verification platform may use machine learning to perform the identity verification. For example, the identity verification platform may use machine learning to determine whether a user attribute is indicative of legitimate activity, use machine learning to determine how to assign a weight to the user attribute, and/or the like. The machine learning implementation is described in more detail below in relation to FIG. 2.

In some implementations, the machine learning model may determine a deviation tolerance associated with the user. The deviation tolerance is a tolerance of deviation of the user interaction from the authentication path in one or more directions. The behavioral data may include the deviation of the user interaction, and the authentication of the user may be based on a comparison of the deviation with the deviation tolerance. The deviation tolerance may vary depending on the state of the user, such as whether the user is stationary or in motion (e.g., as determined by the GPS and/or gyroscope of the user device. If the user is in motion, then the deviation tolerance may be higher than if the user is stationary.

In some implementations, the identity verification platform may perform a biometric authentication in addition to and/or in connection with the performance of the maze. For example, if the user interaction includes a finger of the user, then the biometric authentication may be a scan of a fingerprint of the finger. The scan of the fingerprint may be compared with a stored fingerprint scan. If the user completes the maze, but the fingerprint scan does not match the stored fingerprint scan, then the user may not be authenticated. As another example, if the user interaction includes a retina of the user, then the biometric authentication may be a retina scan of the retina. The scan of the retina may be compared with a stored retina scan. If the user completes the maze, but the retina scan does not match the stored retina scan, then the user may not be authenticated. The retina scan may be performed as biometric authentication during other forms of the user interaction (e.g., finger, stylus, or cursor).

As shown in FIG. 1C, based on performing identity verification, the identity verification platform may determine a recommended action. Recommended actions may include allowing access to a resource, blocking access to a resource, requesting additional data from the user device, and/or the like. As shown by reference number 118, the identity verification platform may transmit an indication of the recommended action to the server device. The server device may perform processing on the indication of the recommended action. As shown in FIG. 1C, and by reference number 120, the server device may send the indication of the recommended action to the user device. As shown in FIG. 1C, and by reference number 122, the user device may display the recommended action. For example, the user device may display a notification that the identity verification, authentication, and/or the like was successful. In some implementations, the user device may allow access to the resource, secure area, and/or the like. Recommended actions may include denying access to the resource, secure area, and/or the like; requesting additional data; and/or the like (such as described in relation to FIG. 1B).

As described above, a completion of a maze on a user device by the user may be used to authenticate the user's identity based on behavioral data collected while the user is performing the maze. The system may be able to detect illegitimate access by analyzing the behavioral data. The behavioral data may be unique to each user and difficult for an illegitimate user to imitate, allowing the identity verification platform to successfully verify an identity and/or detect illegitimate access. This may result in accurate identity verification, which in turn saves computing resources associated with identifying, diagnosing, and remedying illegitimate activity after the fact (e.g., after the illegitimate activity occurs). For example, computing resources used to reverse an illegitimate transaction that resulted from incorrect identity verification may be saved.

As indicated above, FIGS. 1A-1C are provided as an example. Other examples may differ from what is described with regard to FIGS. 1A-1C.

Figure 2:
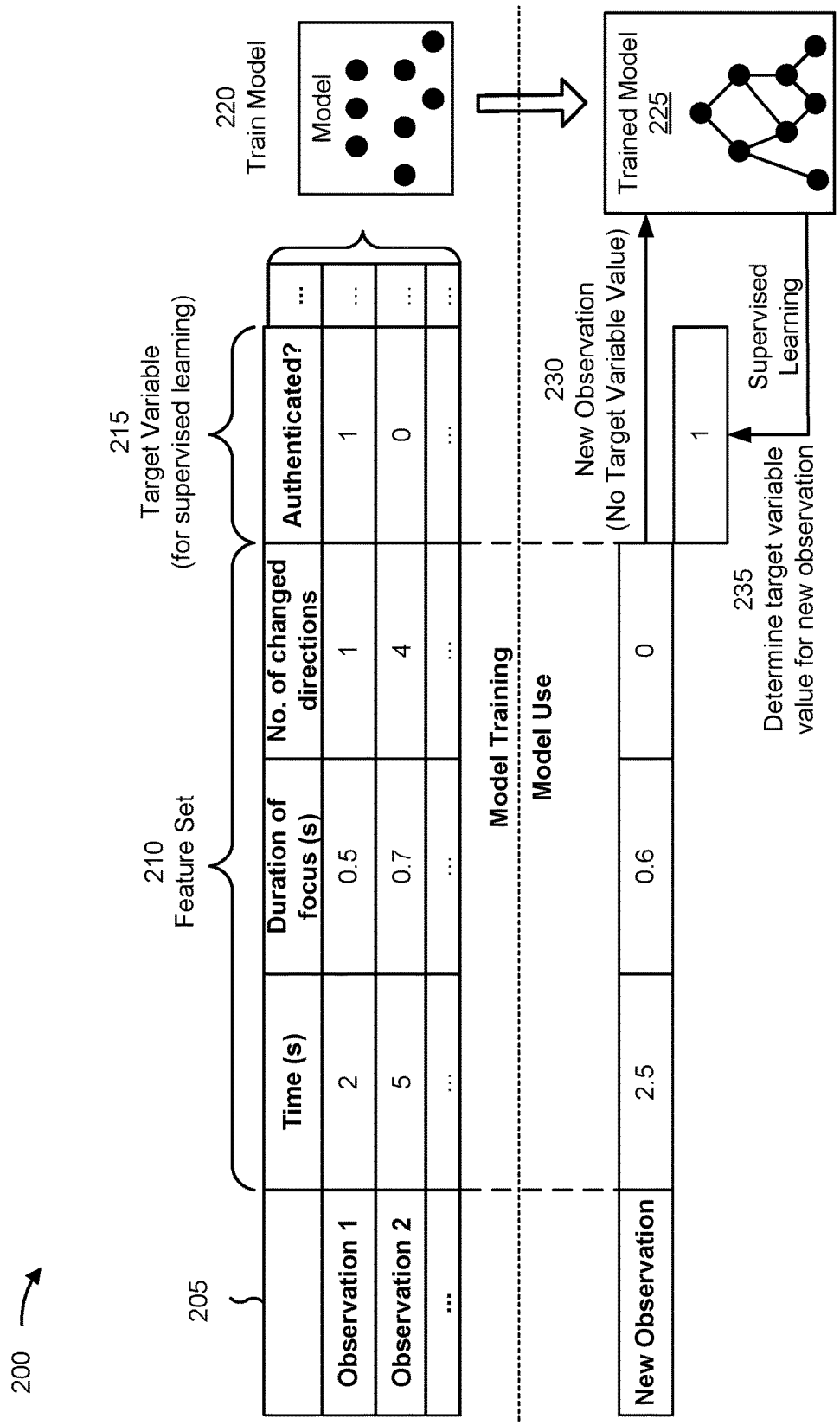
FIG. 2 is a diagram illustrating an example of training and using a machine learning model in connection with maze-based user authentication, in accordance with some embodiments of the present disclosure.

FIG. 2 is a diagram illustrating an example 200 of training and using a machine learning model in connection with maze-based user authentication. The machine learning model training and usage described herein may be performed using a machine learning system. The machine learning system may include or may be included in a computing device, a server, a cloud computing environment, or the like, such as the identity verification platform described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the server device and/or the user device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the server device and/or the user device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of time (e.g., time it takes the user to complete the maze), a second feature of duration of focus of the user's retina on a digital landmark, a third feature of a number of changed or reversed directions, and so on. As shown, for a first observation, the first feature may have a value of 2 seconds, the second feature may have a value of 0.5 seconds, the third feature may have a value of 1, and so on. These features and feature values are provided as examples, and may differ in other examples. For example, the feature set may include one or more of the following features: an average proximity to the walls of the maze, a particular starting point (of multiple different starting points), a particular finishing point (of multiple different finishing points), and/or a speed of movement along the authentication path.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether or not the user is authenticated (e.g., as indicated by a binary 0 or 1 value), which has a value of 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on a set of training or set up mazes performed by the user, as described elsewhere herein, or past mazes completed by the user to authenticate the user.

As shown by reference number 230, the machine learning system may apply the trained machine learning model 225 to a new observation, such as by receiving a new observation and inputting the new observation to the trained machine learning model 225. As shown, the new observation may include a first feature of time, with a value of 2.5 seconds, a second feature of duration of focus of the user's retina on a digital landmark, with a value of 0.6 seconds, a third feature of a number of changed directions, with a value of 0, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 1 for the target variable of whether or not the user is authenticated for the new observation, as shown by reference number 235. Based on this prediction, the machine learning system may provide a first recommendation and/or may provide output for determination of a first recommendation. The first recommendation may include, for example, provide access to a resource (e.g., a user account).

As another example, if the machine learning system were to predict a value of 0 for the target variable of whether the user is authenticated, then the machine learning system may provide a second (e.g., different) recommendation (e.g., deny or block access to the resource and/or request additional data to verify an identity).

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an indication that the authenticated user was not actually the user (e.g., via an improper access alert from the actual user) or that the un-authenticated user was actually the user (e.g., via additional verification information provided by the user).

In this way, the machine learning system may apply a rigorous and automated process to authenticate users via behavioral data associated with completing a maze. The machine learning system enables recognition and/or identification of tens, hundreds, thousands, or millions of features and/or feature values for tens, hundreds, thousands, or millions of observations, thereby increasing accuracy and consistency and reducing delay associated with authenticating users via behavioral data associated with completing a maze relative to requiring computing resources to be allocated for tens, hundreds, or thousands of operators to manually authenticate users via behavioral data associated with completing a maze using the features or feature values.

As indicated above, FIG. 2 is provided as an example. Other examples may differ from what is described in connection with FIG. 2.

Figure 3:
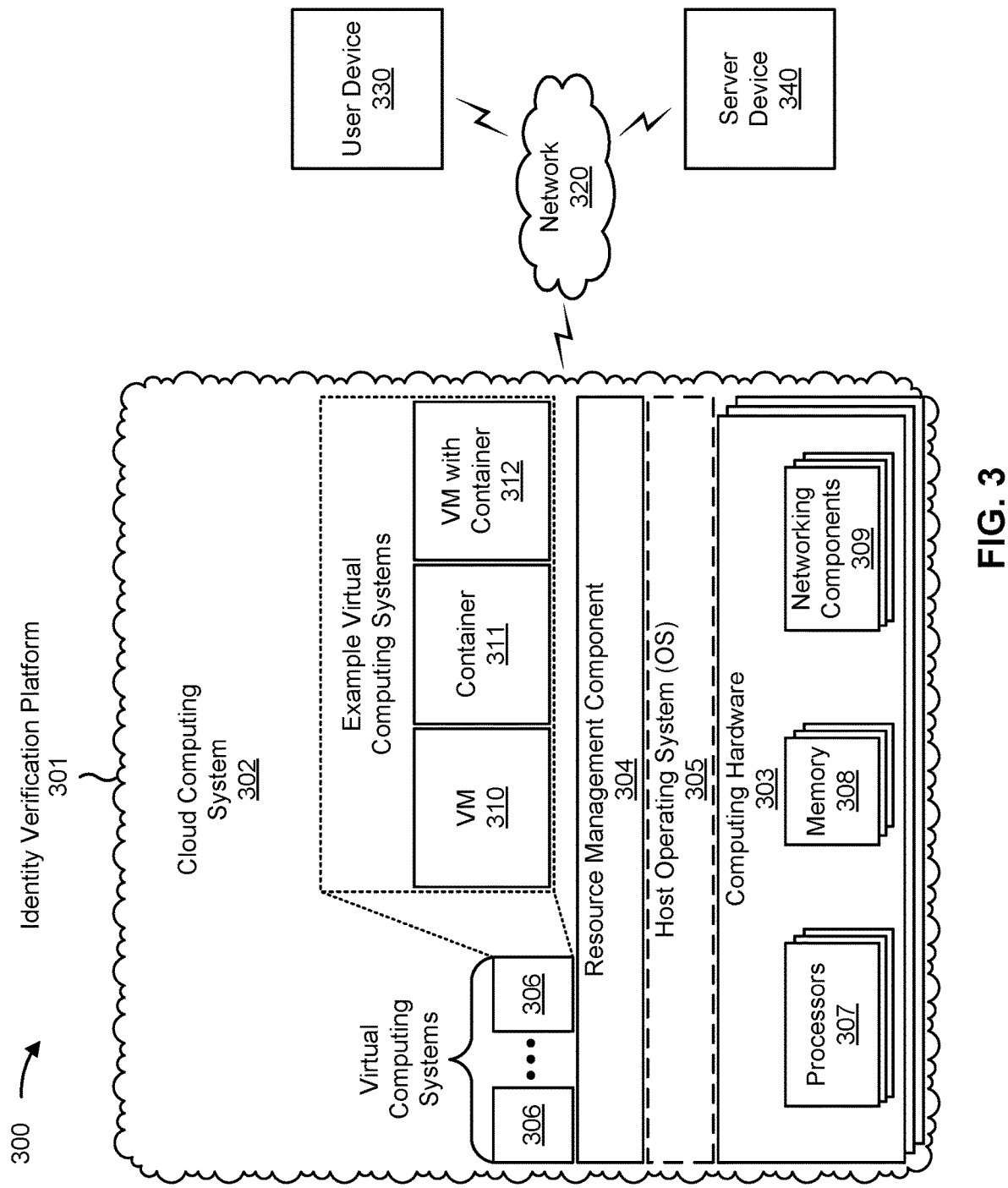
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an identity verification platform 301, which may include one or more elements of and/or may execute within a cloud computing system 302. The cloud computing system 302 may include one or more elements 303-312, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the identity verification platform 301 may include one or more elements 303-312 of the cloud computing system 302, may execute within the cloud computing system 302, and/or may be hosted within the cloud computing system 302, in some implementations, the identity verification platform 301 may not be cloud-based (e.g., may be implemented outside of a cloud computing system) or may be partially cloud-based. For example, the identity verification platform 301 may include one or more devices that are not part of the cloud computing system 302, such as device 400 of FIG. 4, which may include a standalone server or another type of computing device. The identity verification platform 301 may perform one or more operations and/or processes described in more detail elsewhere herein.

Network 320 may include one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The user device 330 may include one or more devices capable of receiving, generating, storing, processing, and/or providing information associated with maze-based user authentication, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 340 may include one or more devices capable of receiving, generating, storing, processing, providing, and/or routing information associated with maze-based user authentication, as described elsewhere herein. The server device 340 may include a communication device and/or a computing device. For example, the server device 340 may include a server, such as an application server, a client server, a web server, a database server, a host server, a proxy server, a virtual server (e.g., executing on computing hardware), or a server in a cloud computing system. In some implementations, the server device 340 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
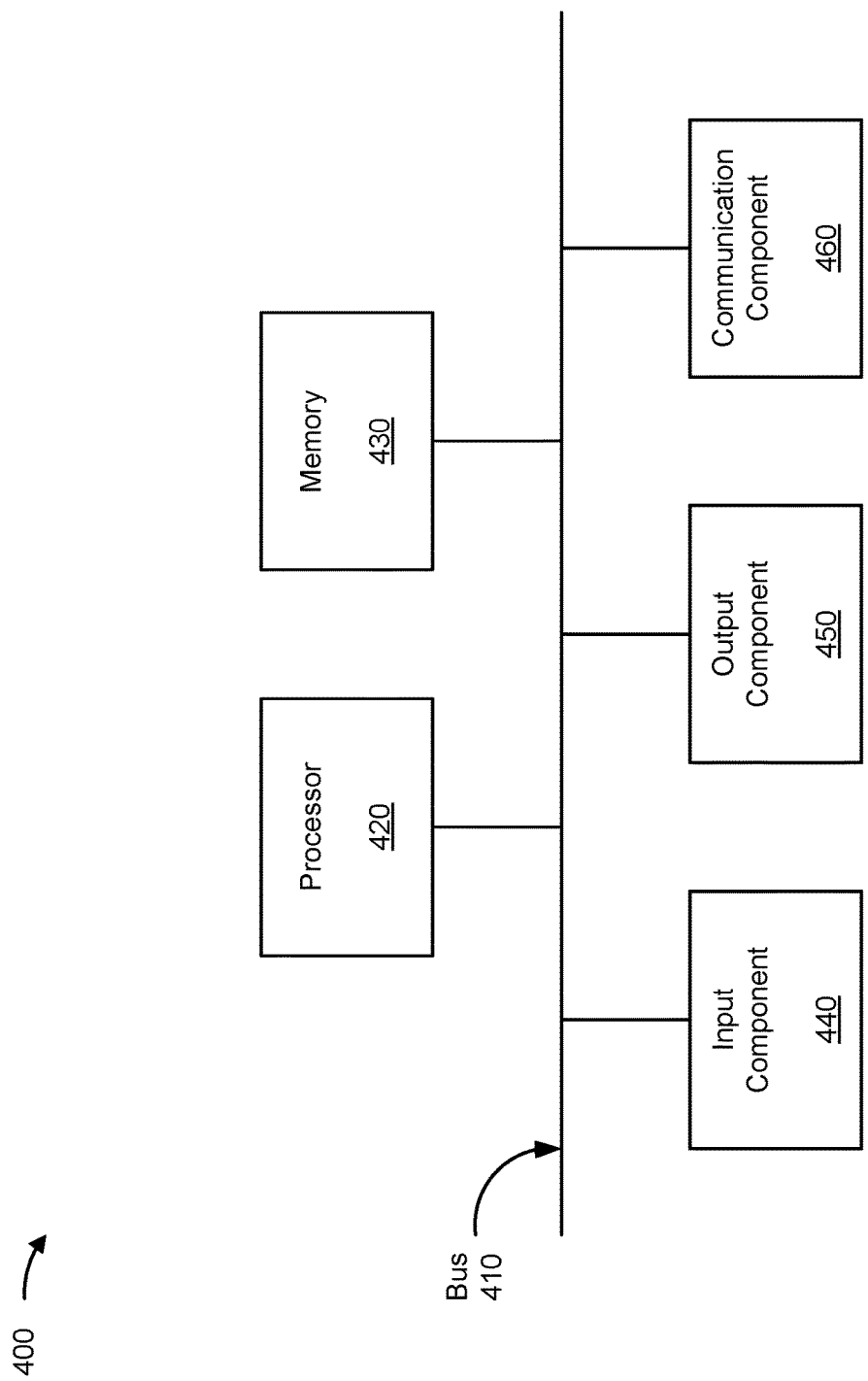
FIG. 4 is a diagram of example components of a device associated with maze-based user authentication, in accordance with some embodiments of the present disclosure.

FIG. 4 is a diagram of example components of a device 400 associated with maze-based user authentication. Device 400 may correspond to identity verification platform 301, user device 330, and/or server device 340. In some implementations, the identity verification platform, the user device, and/or the server device may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
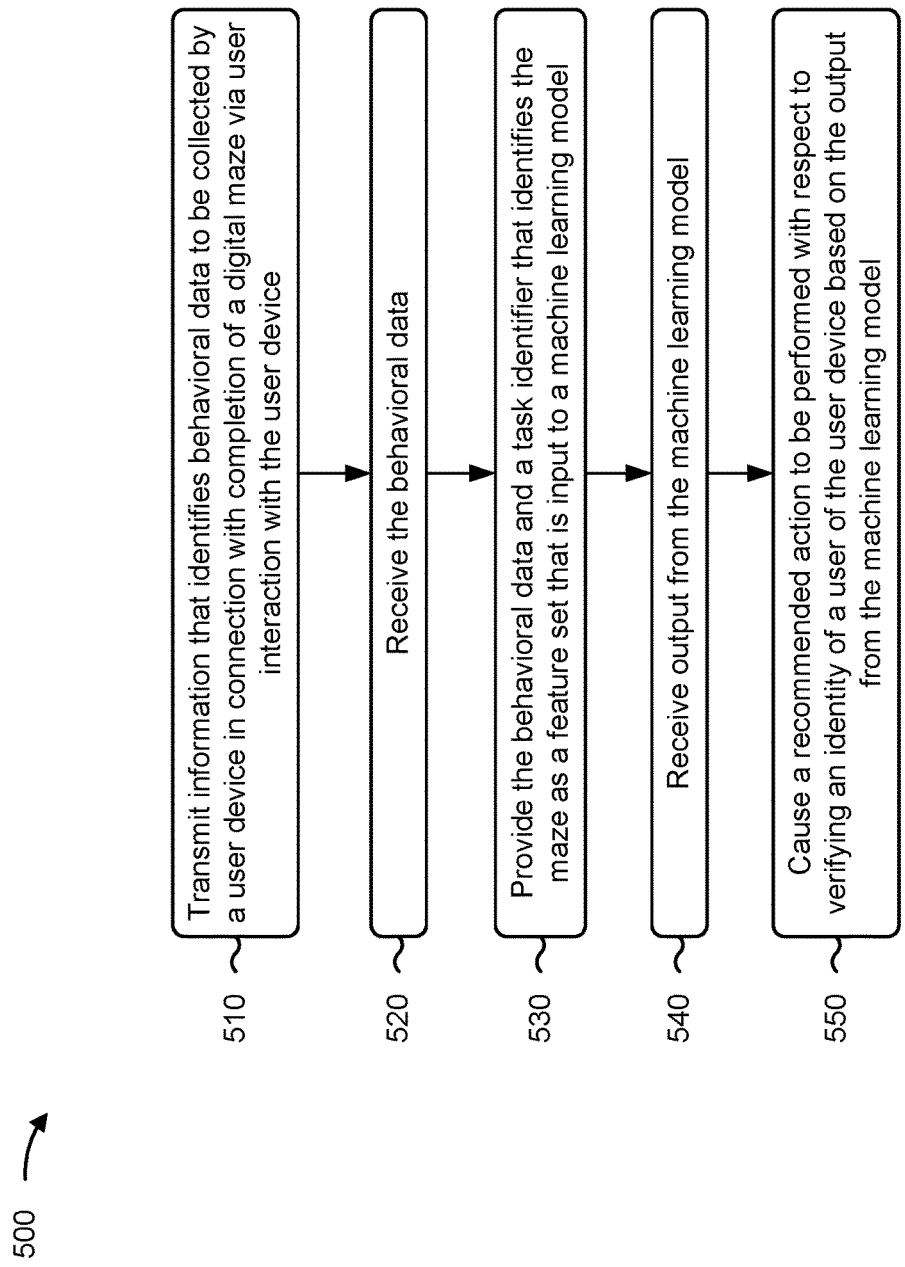
FIGS. 5 and 6 are flowcharts of an example process associated with maze-based user authentication, in accordance with some embodiments of the present disclosure.

FIG. 5 is a flowchart of an example process 500 associated with maze-based user authentication. In some implementations, one or more process blocks of FIG. 5 may be performed by the identity verification platform 301. In some implementations, one or more process blocks of FIG. 5 may be performed by another device or a group of devices separate from or including the identity verification platform 301, such as the server device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include transmitting information that identifies behavioral data to be collected by a user device in connection with completion of a digital maze via user interaction with the user device (block 510). For example, the server device 340 (e.g., using processor 420, memory 430, and/or communication component 460) may transmit information that identifies behavioral data to be collected by a user device in connection with completion of a digital maze via user interaction with the user device, as described above in connection with reference number 106 of FIG. 1A. As an example, the server device may transmit maze data indicating the digital maze and the behavioral data to be collected as the user performs and/or completes the digital maze.

In some implementations, the digital maze may include a starting point, a finishing point, and an authentication path between the starting point and the finishing point. In some implementations, the digital maze may include a plurality of digital landmarks in the digital maze. In some implementations, a subset of the digital landmarks may be along the authentication path.

As further shown in FIG. 5, process 500 may include receiving the behavioral data (block 520). For example, the identity verification platform 301 (e.g., using processor 420, memory 430, input component 440, and/or communication component 460) may receive the behavioral data, as described above in connection with reference number 114 of FIG. 1B. As an example, the user device may obtain user input (e.g., the user interaction with the user device to complete the maze) and may collect the behavioral data from the user input. The user device may transmit, and the server device may receive, the input and behavioral data. The server device may, in turn, transmit, and the identity verification platform may receive, the input and behavioral data. In some implementations, a subset of the behavioral data may be associated with the plurality of digital landmarks.

As further shown in FIG. 5, process 500 may include providing the behavioral data and a task identifier that identifies the maze as a feature set that is input to a machine learning model (block 530). For example, the identity verification platform 301 (e.g., using processor 420 and/or memory 430) may provide the behavioral data and a task identifier that identifies the maze as a feature set that is input to a machine learning model, as described above in connection with reference number 210 of FIG. 2. As an example, the behavioral data may include a velocity of the user interaction through the subset of digital landmarks, an acceleration of the user interaction to or through one of the subset of digital landmarks, and/or a pause in the user interaction along the authentication path that exceeds a time threshold and is within a distance of one of the subset of digital landmarks.

As further shown in FIG. 5, process 500 may include receiving output from the machine learning model (block 540). For example, the identity verification platform 301 (e.g., using processor 420, memory 430, input component 440, and/or communication component 460) may receive output from the machine learning model, as described above in connection with reference number 215 of FIG. 2. As an example, the output may be a binary value 0 or 1, indicative of whether or not the user has been authenticated, as determined by the machine learning model.

As further shown in FIG. 5, process 500 may include causing a recommended action to be performed with respect to verifying an identity of a user of the user device based on the output from the machine learning model (block 550). For example, the identity verification platform 301 (e.g., using processor 420 and/or memory 430) may cause a recommended action to be performed with respect to verifying an identity of a user of the user device based on the output from the machine learning model, as described above in connection with reference number 118 of FIG. 1C. As an example, the identity verification platform may transmit, to the server device, an indication of a recommended action (e.g., to allow access to a resource, to block access to the resource, or to request additional data from the user).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
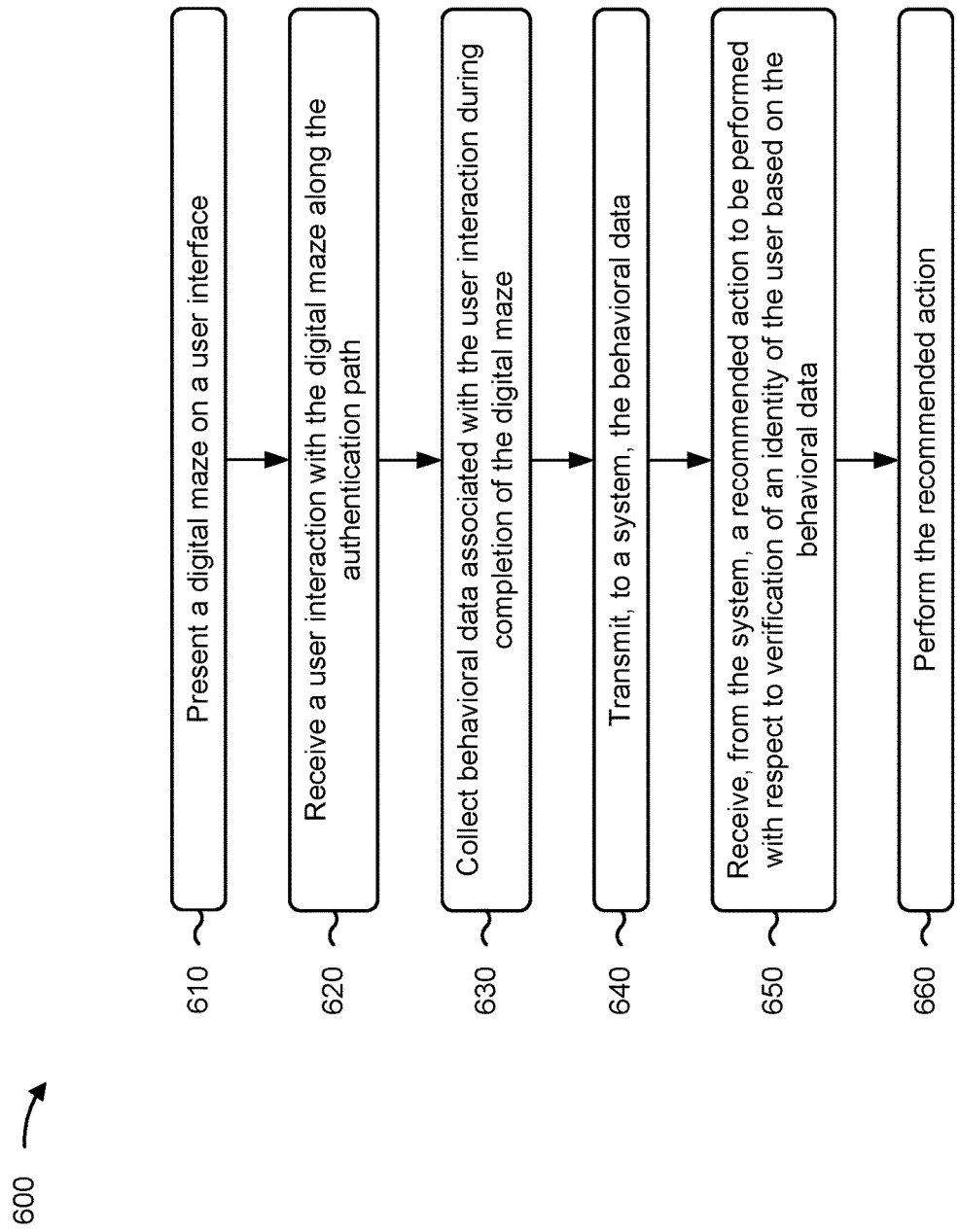

FIG. 6 is a flowchart of an example process 600 associated with maze-based user authentication. In some implementations, one or more process blocks of FIG. 6 may be performed by the user device 330. In some implementations, one or more process blocks of FIG. 6 may be performed by one or more components of the device 400, such as processor 420, memory 430, input component 440, output component 450, and/or communication component 460.

As shown in FIG. 6, process 600 may include presenting, on a user interface of the user device, a digital maze (block 610). For example, the user device 330 (e.g., using processor 420, memory 430, and/or output component 450) may present, on a user interface of the user device, a digital maze, as described above in connection with reference number 108 of FIG. 1A. As an example, in response to a request, to the server device from the user device, to verify an identity of the user, the user device may receive, from the server device, maze data indicating the digital maze.

In some implementations, the digital maze may include a starting point, a finishing point, and an authentication path between the starting point and the finishing point. In some implementations, the digital maze may include a plurality of digital landmarks in the digital maze. In some implementations, a subset of the digital landmarks are along the authentication path.

As further shown in FIG. 6, process 600 may include receiving a user interaction with the digital maze along the authentication path (block 620). For example, the user device 330 (e.g., using processor 420, memory 430, input component 440, and/or communication component 460) may receive a user interaction with the digital maze along the authentication path, as described above in connection with reference number 110 of FIG. 1B. As an example, the user device may detect a user interaction with the user device along the authentication path.

As further shown in FIG. 6, process 600 may include collecting behavioral data associated with the user interaction during completion of the digital maze (block 630). For example, the user device 330 (e.g., using processor 420 and/or memory 430) may collect behavioral data associated with the user interaction during completion of the digital maze, as described above in connection with reference number 110 of FIG. 1B. As an example, the user device may collect behavioral data along with detecting the user interaction (e.g., while the user interaction with the user device is occurring in connection with the user completing the digital maze).

As further shown in FIG. 6, process 600 may include transmitting, to a system, the behavioral data (block 640). For example, the user device 330 (e.g., using processor 420, memory 430, and/or communication component 460) may transmit, to a system, the behavioral data, as described above in connection with reference number 112 of FIG. 1B. As an example, the user device may transmit, to the server device, the input and behavioral data associated with the user interaction with the user device in connection with completing the digital maze.

As further shown in FIG. 6, process 600 may include receiving, from the system, a recommended action to be performed with respect to verification of an identity of the user based on the behavioral data (block 650). For example, the user device 330 (e.g., using processor 420, memory 430, input component 440, and/or communication component 460) may receive, from the system, a recommended action to be performed with respect to verification of an identity of the user based on the behavioral data, as described above in connection with reference number 120 of FIG. 1C. As an example, the user device may receive, from the server device, an indication of the recommended action (e.g., a successful login to the user's account).

As further shown in FIG. 6, process 600 may include performing the recommended action (block 660). For example, the user device 330 (e.g., using processor 420 and/or memory 430) may perform the recommended action, as described above in connection with reference number 122 of FIG. 1C. As an example, the user device may perform and/or display the recommended action (e.g., the successful login to the user's account).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for maze-based user authentication, comprising:
   one or more memories; and
   one or more processors, communicatively coupled to the one or more memories, configured to:
      transmit information that identifies behavioral data to be collected by a user device in connection with completion of a digital maze via user interaction with the user device,
         wherein the digital maze includes a starting point, a finishing point, and an authentication path between the starting point and the finishing point,
         wherein the digital maze includes a plurality of digital landmarks in the digital maze, and
         wherein a subset of the digital landmarks are along the authentication path;
      receive the behavioral data,
         wherein the behavioral data is collected by the user device during performance of the maze via the user interaction with the user device, and
         wherein a subset of the behavioral data is associated with the plurality of digital landmarks;
      provide the behavioral data, including the subset of the behavioral data associated with the plurality of digital landmarks, and a task identifier, that identifies the maze, as a feature set that is input to a machine learning model;
      receive output from the machine learning model; and
      cause a recommended action to be performed with respect to verifying an identity of a user of the user device based on the output from the machine learning model.

2. The system of claim 1, wherein the plurality of digital landmarks includes multiple types of digital landmarks, and wherein the subset of the plurality of digital landmarks includes a common type of the multiple types of digital landmarks.

3. The system of claim 2, wherein the subset of the behavioral data associated with the plurality of digital landmarks includes a number of instances that the user interaction passes through a particular digital landmark, of the plurality of digital landmarks, that is of a type, of the multiple types of digital landmarks, that is different from the common type.

4. The system of claim 1, wherein the plurality of digital landmarks includes multiple types of digital landmarks,
   wherein the subset of the plurality of digital landmarks includes more than one of the multiple types of digital landmarks, and
   wherein the subset of the behavioral data associated with the plurality of digital landmarks includes an order in which the more than one of the multiple types of digital landmarks are passed through via the user interaction.

5. The system of claim 1, wherein the subset of the behavioral data associated with the plurality of digital landmarks includes at least one of:
   a velocity of the user interaction through the subset of digital landmarks,
   an acceleration of the user interaction to or through one of the subset of digital landmarks, or
   a pause in the user interaction along the authentication path that exceeds a time threshold and is within a distance of one of the subset of digital landmarks.

6. The system of claim 1, wherein the digital maze includes a plurality of starting points and a plurality of finishing points,
   wherein a plurality of paths are defined from one of the plurality of starting points to one of the plurality of finishing points, and
   wherein the authentication path is one of the plurality of paths.

7. The system of claim 1, wherein the machine learning model is configured to determine a maze completion proficiency level of the user, and
   wherein a difficulty of the digital maze is based on the maze completion proficiency level of the user.

8. The system of claim 1, wherein the machine learning model is configured to determine a deviation tolerance associated with the user, and
   wherein the deviation tolerance is a tolerance of deviation of the user interaction from the authentication path in one or more directions.

9. A method, comprising:
   receiving, by a system having one or more processors, a request to verify an identity of a user;
   transmitting, by the system, information that identifies a digital maze to be completed via user interaction with a user device and information that identifies behavioral data to be collected by the user device in connection with completion of the digital maze,
      wherein the digital maze includes a starting point, a finishing point, and an authentication path between the starting point and the finishing point, and
      wherein a difficulty of the digital maze is based on a maze completion proficiency of the user;
   receiving, by the system, the behavioral data, wherein the behavioral data is collected by the user device during completion of the digital maze via user interaction with the user device, performing, by the system, identity verification associated with the user based on the behavioral data and the digital maze,
  wherein the identity verification is performed using a machine learning model that identifies patterns associated with the behavioral data and the digital maze; and
transmitting, by the system, an indication of a recommended action to be performed with respect to the user and the user device based on performing the identity verification.

10. The method of claim 9, wherein the behavioral data relates to at least one of:
  time to complete the digital maze,
  velocity of the user interaction,
  acceleration of the user interaction,
  a number of deviations from the authentication path,
  a proximity of the user interaction to walls forming the digital maze,
  a proximity of the user interaction to corners in the digital maze,
  pressure of the user interaction with the user device, or
  size of a finger associated with the user interaction.

11. The method of claim 9, wherein the recommended action includes one of:
  approving access, by the user device, to a resource,
  denying access, by the user device, to the resource, or
  transmitting information that identifies a second digital maze to be completed via user interaction with the user device,
    wherein a difficulty of the second digital maze is higher than the difficulty of the digital maze.

12. The method of claim 9, wherein the digital maze includes a plurality of starting points and a plurality of finishing points,
  wherein a plurality of paths are defined from one of the plurality of starting points to one of the plurality of finishing points, and
  wherein the authentication path is one of the plurality of paths.

13. The method of claim 9, further comprising:
determining a maze completion proficiency level of the user,
  wherein a difficulty of the digital maze is based on the maze completion proficiency level of the user.

14. The method of claim 9, further comprising:
determining a deviation tolerance associated with the user,
  wherein the deviation tolerance is a tolerance of deviation of the user interaction from the authentication path in one or more directions.

15. A user device comprising:
a memory; and
one or more processors, communicatively coupled to the memory, configured to:
  present, on a user interface of the user device, a digital maze,
    wherein the digital maze includes a starting point, a finishing point, and an authentication path between the starting point and the finishing point,
    wherein the digital maze includes a plurality of digital landmarks in the digital maze, and
    wherein a subset of the digital landmarks are along the authentication path;
  receive a user interaction with the digital maze along the authentication path;
  collect behavioral data associated with the user interaction during completion of the digital maze;
  transmit, to a system, the behavioral data;
  receive, from the system, a recommended action to be performed with respect to verification of an identity of the user based on the behavioral data; and
  perform the recommended action.

16. The user device of claim 15, further comprising a retina scanner configured to scan a retina of the user during the user interaction,
  wherein verification of the identity of the user is further based on a comparison of the scan of the retina of the user with a stored retina scan associated with the user.

17. The user device of claim 15, further comprising a retina scanner configured to scan a retina of the user and track movement of the retina along the authentication path, and
  wherein the behavioral data is collected based on the movement of the retina along the authentication path.

18. The user device of claim 17, wherein the behavioral data includes at least one of:
  a duration that the retina is focused on the subset of the digital landmarks along the authentication path, or
  a number of times that the retina focuses on a particular one of the digital landmarks before the user interaction passes through the particular one of the digital landmarks.

19. The user device of claim 17, wherein the plurality of digital landmarks include multiple types of digital landmarks,
  wherein the subset of the plurality of digital landmarks include a common type of the multiple types of digital landmarks, and
  wherein the behavioral data includes a number of times the retina looks at one or more of the plurality of digital landmarks that has a type, of the multiple types of digital landmarks, that is different from the common type.

20. The user device of claim 15, wherein the digital maze includes a plurality of starting points and a plurality of finishing points,
  wherein a plurality of paths are defined from one of the plurality of starting points to one of the plurality of finishing points, and
  wherein the authentication path is one of the plurality of paths.

* * * * *